Patented Aug. 26, 1930

1,773,970

UNITED STATES PATENT OFFICE

HENRY DREYFUS, OF LONDON, ENGLAND

PRODUCTION OF A KETEN

No Drawing. Application filed May 27, 1926, Serial No. 112,164, and in Great Britain June 13, 1925

This invention relates to process for the production of keten from mixtures of or containing hydrogen and carbon monoxide.

In my co-pending application 112,162, filed May 27, 1926, I have indicated and discussed the history of the gas reactions between carbon monoxide and hydrogen and the products obtained therefrom in the past, and the more recent researches which have been made in connection with said reactions. For the sake of brevity I do not repeat this here but refer to what I have stated in this connection in my said other specification, and I desire that this shall be understood as repeated in detail here.

My said specification concerns especially the production of methyl alcohol from mixtures of or containing hydrogen and carbon monoxide in certain relative proportions under the action of heat and pressure, with the aid of certain catalysts such as therein indicated, the formation of methyl alcohol taking place, as is believed via intermediate formation of formaldehyde which is converted into methyl alcohol by splitting off carbon monoxide.

The object of the present invention is to produce keten from mixtures of or containing hydrogen and carbon monoxide by combination of these gases under heat and pressure in presence of catalysts.

For this purpose I employ the carbon monoxide and hydrogen in about the relative proportions necessary to satisfy the chemical equation, say about three molecules of carbon monoxide to one molecule of hydrogen ($3CO + H_2 = CO_2 + CH_2CO$), it being understood that I do not confine myself closely to these relative proportions of carbon monoxide and hydrogen and that the same may be varied within certain limits.

For the purpose of the reaction catalysts or mixtures of catalysts may be employed similar to those indicated in my said U. S. specification Serial No. 112,162. As therein stated, the catalysts employed are such as are capable of effecting the combination of carbon monoxide and hydrogen to form oxygenated organic compounds. As examples of such catalysts may be mentioned zinc oxide, copper oxide, copper chromate, zinc chromate, zinc aluminates, potassium zincate or their mixtures of two together or several together; zinc oxide with potassium acetate or potassium carbonate, or zinc oxide with aluminium, copper or zinc or tin with potassium carbonate or sodium carbonate of their corresponding acetates; or even caustic alkali combined with zinc oxide or copper oxide. These catalysts are only enumerated by way of example, without being limitative, as any other suitable catalysts or catalyst mixtures having the desired effect may be employed, be it in the form of metals or their salts or mixtures of metals and their salts especially salts of the type of chromate, vanadates, etc., preferably when a catalyst of basic nature and preferably relatively strong basic nature is present.

In carrying out the process one may employ similar conditions of temperature and pressure etc. to those indicated for the production of methyl alcohol in my said other specification, for example temperatures below about 400°–450°, and preferably between about 200° and 300° C., and pressures which may be up to 200 atmospheres or more, variable according to the catalysts used, but generally pressures of about 50 to 150 atmospheres.

Catalysts favouring the production of methane or more than traces of methane should be avoided.

In executing the process of the present invention the speed of passage of the gases has also an influence, as if they are passed through the apparatus at relatively low speed, hydrocarbons and higher alcohols may be formed.

What I claim and desire to secure by Letters Patent is:—

1. A process for the manufacture of keten, comprising subjecting a gaseous mixture containing hydrogen and carbon monoxide in the relative proportion of about three molecules of carbon monoxide to one molecule of hydrogen to the action of heat and pressure in the presence of a catalyst capable of combining hydrogen and carbon monoxide to form oxygenated organic compounds.

2. A process for the manufacture of keten, comprising subjecting a gaseous mixture containing hydrogen and carbon monoxide in the relative proportion of about three molecules of carbon monoxide to one molecule of hydrogen to the action of heat and pressure in the presence of a catalyst comprising zinc oxide.

3. A process for the manufacture of keten, comprising heating a gaseous mixture containing hydrogen and carbon monoxide in the relative proportion of about three molecules of carbon monoxide to one molecule of hydrogen under pressure at a temperature less than about 450° C. in the presence of a catalyst capable of combining hydrogen and carbon monoxide to form oxygenated organic compounds.

4. A process for the manufacture of keten, comprising heating a gaseous mixture containing hydrogen and carbon monoxide in the relative proportion of about three molecules of carbon monoxide to one molecule of hydrogen under pressure at a temperature less than about 450° C. in the presence of a catalyst comprising zinc oxide.

5. A process for the manufacture of keten, comprising heating a gaseous mixture containing hydrogen and carbon monoxide in the relative proportion of about three molecules of carbon monoxide to one molecule of hydrogen under a pressure not exceeding 200 atmospheres in the presence of a catalyst capable of combining hydrogen and carbon monoxide to form oxygenated organic compounds.

6. A process for the manufacture of keten, comprising heating a gaseous mixture containing hydrogen and carbon monoxide in the relative proportion of about three molecules of carbon monoxide to one molecule of hydrogen under a pressure not exceeding 200 atmospheres in the presence of a catalyst comprising zinc oxide.

7. A process for the manufacture of keten, comprising heating a gaseous mixture containing hydrogen and carbon monoxide in the relative proportion of about three molecules of carbon monoxide to one molecule of hydrogen under pressure at a temperature between 200° and 300° C. in the presence of a catalyst capable of combining hydrogen and carbon monoxide to form oxygenated organic compounds.

8. A process for the manufacture of keten, comprising heating a gaseous mixture containing hydrogen and carbon monoxide in the relative proportion of about three molecules of carbon monoxide to one molecule of hydrogen under pressure at a temperature between about 200° and 300° C. in the presence of a catalyst comprising zinc oxide.

9. A process for the manufacture of keten, comprising heating a gaseous mixture containing hydrogen and carbon monoxide in the relative proportion of about three molecules of carbon monoxide to one molecule of hydrogen at a temperature between about 200° and 300° C. and under a pressure between about 50 and 150 atmospheres in the presence of a catalyst capable of combining hydrogen and carbon monoxide to form oxygenated organic compounds.

10. A process for the manufacture of keten, comprising heating a gaseous mixture containing hydrogen and carbon monoxide in the relative proportion of about three molecules of carbon monoxide to one molecule of hydrogen under a pressure between about 50 and 150 atmospheres in the presence of a catalyst capable of combining hydrogen and carbon monoxide to form oxygenated organic compounds.

In testimony whereof I have hereunto subscribed my name.

HENRY DREYFUS.